United States Patent [19]

Clymer et al.

[11] 4,034,774
[45] July 12, 1977

[54] LOW POINT CONTROL SYSTEM

[75] Inventors: Henry F. Clymer; John J. Kaltenbaugh, both of Dallas, Tex.

[73] Assignee: Lone Star Gas Company, Dallas, Tex.

[21] Appl. No.: 593,320

[22] Filed: July 7, 1975

[51] Int. Cl.² ........................................ G05D 11/13
[52] U.S. Cl. ................................ 137/111; 137/551; 137/624.2
[58] Field of Search ............ 137/118, 551, 624.11, 137/624.15, 624.2, 111

[56] References Cited

U.S. PATENT DOCUMENTS

| | | | |
|---|---|---|---|
| 2,402,522 | 6/1946 | Bucknam | 137/111 |
| 2,599,680 | 6/1952 | Weeks | 137/118 |
| 3,036,229 | 5/1962 | Kemp et al. | 137/624.15 |
| 3,073,330 | 1/1963 | Fattor | 137/624.15 |
| 3,098,505 | 7/1963 | Zappia | 137/624.15 |
| 3,370,753 | 2/1968 | Yingst | 137/111 |
| 3,440,434 | 4/1969 | Yates et al. | 137/624.2 |
| 3,524,444 | 8/1970 | Ellard et al. | 137/111 |
| 3,541,593 | 11/1970 | Weston | 137/118 |
| 3,624,627 | 11/1971 | Evans | 137/551 |
| 3,708,068 | 1/1973 | Tischler | 137/624.2 |
| 3,872,876 | 3/1975 | Bachman | 137/118 |
| 3,894,560 | 7/1975 | Baugh | 137/606 |

FOREIGN PATENT DOCUMENTS

| | | | |
|---|---|---|---|
| 1,012,898 | 6/1955 | Germany | 137/111 |

Primary Examiner—William R. Cline
Assistant Examiner—H. Jay Spiegel
Attorney, Agent, or Firm—Howard E. Moore

[57] ABSTRACT

A gas distribution system wherein a plurality of control valves in gas collection lines are actuated by signals of timed duration received from a pressure controller at a control station, the signals being generated in response to changes in gas pressure in a gas distribution network. Timer controlled adjustable cam operated switches control the time duration of signals delivered from the control station to each control valve. Manually actuated switches at the control station are connected to by-pass the controller to simultaneously deliver signals to each control valve such that all of the control valves can be simultaneously actuated. A failure sensing device is a telemeter transmitter to transmit signals related to pressure in the gas distribution network which is equipped with a failure sensing device to deliver signals to the control station to cut out the controller and timer if the transmitter fails for any reason.

14 Claims, 3 Drawing Figures

LOW POINT CONTROL SYSTEM

BACKGROUND OF THE INVENTION

The present invention relates to a control system for a gas distribution system. More particularly, the present invention relates to a control system for maintaining gas distribution system pressures at the remote ends or "low points" of the system.

One of the problems faced by gas distribution companies is the maintenance of minimum service pressures, particularly at points remote from the supply or pressure-regulating station, or the so-called low points of the system, where experience or tests indicate that the lowest pressures in the system will normally exist. Such maintenance of minimum pressures, at all points in the system, is essential from the standpoint of adequate service to the customer as well as safety.

An obvious solution to this problem would be to feed the gas from the supply or pumping station to the distribution system at a rate substantially higher than that required to meet expected consumption and thus maintain the minimum pressures required at all points in the system, including the low points. However, under these circumstances, excessive pressures would occur at points in the system where the pressure is normally high and create its own problems. Safety is, of course, a major problem of excess pressure, but another perplexing and costly problem is excessive leakage losses in the distribution system. As the pressure increases, losses due to leakage in the distribution system increase. Thus, the system pressure should also be kept as low as possible while still maintaining an adequate minimum pressure.

The problem of maintaining minimum and maximum pressures in a distribution system is further complicated by radical variations in gas consumption, due to seasonal demand, as well as unforeseen demand, or unexpected variations in the timing or duration of the peak seasonal loads.

Accordingly, it was common practice for an operator at the supply station to increase the pressure at the supply station, usually in accordance with a schedule based on previous records of consumption during peak seasonal periods, to take care of predictable increases in demand. However, it was still necessary to maintain excess pressure at the supply station during low consumption periods in order to maintain safe minimum pressures at the low points in the event of unforeseen or unexpected contingencies. This, of course, was costly but it was considered justified as insurance against pressures below the required low level.

As systems became larger, semi-automatic control was then instituted. One such system involved the use of a differential booster system at the main station with a telemetered signal to a satellite station in another part of the town plant. This system leaves a lot to be desired, since the control is not based on gas pressures at the low point of the system. Where larger systems supply larger towns or areas, two or more measuring stations are established in the area served. Gas pressures telemetered to these measuring stations are monitored by dispatcher personnel on 24-hour duty, and gas pressures are manually controlled. Utilizing either of these systems, a minimum pressure of 20 lbs. was usually maintained at the low point, which dropped to about 10 lbs. or less during peak demand.

As systems became still larger, and to free dispatchers from performing manual control of the gas, systems were the installed to automatically control the gas pressure in accordance with the measured low pressures. However, such control systems encounter cycling problems which often overboosted the system. Again, a low-point pressure of 20 lbs. was as low as the system could be operated to safely handle demand on peak heating days. In addition, this system did not alleviate the problem of substantial volumes of unaccounted-for gas, due to leakage and other factors.

Present day distribution systems are often a complex network of piping with a given distribution area fed by one or more regulators. Since the system low point is fed by one or more regulators, the regulator setting must be changed periodically to maintain the desired pressure at this system low point. Increase in the system load between the regulator and the low point will cause the low point pressure to drop, requiring the regulator setting to be increased in order to maintain adequate pressure.

To meet these requirements, systems are now in existence in which the low point pressure is continuously measured and telemetered to a dispatch or control center. The telemetered data is displayed on a pressure indicator or recording chart, usually including high and low pressure alarms. The district pressure regulator is, in turn, remotely controlled by a signal telemetered from the control station. When the measured pressure varies from either the maximum or minimum limits, as indicated by the display and alarm, the operator simply pushes a raise or lower button at the control center to raise or lower the pressure. The push button switch, at the control center, telemeters an appropriate signal to a remote set controller or remote set regulator controlling the district regulator, which, in turn, controls an appropriate valve. After "commanding" the regulator, the operator waits a suitable period of time to see if the pressure comes back within limits. If the pressure does not come back within limits, the button is again pushed to send another command, followed by another waiting period. This procedure is repeated as often as necessary until the proper pressure is attained. This system is not without problems since the operators are kept quite busy during peak load periods, which unfortunately is also the time at which the gas take has to be examined very carefully to insure that the distribution companies do not exceed their limits set by the contract with the supplier.

Consequently, automation of the above system is desirable. However, automation by conventional means is difficult because of the time lag between a change in the district regulator setting and the sensing of the change at the low point transmitter. Further, in many cases, each of a plurality of regulators, supplying a single system with a single low point, must be preset, i.e., one regulator at 5 lbs., another at 6 lbs., etc., to initially balance the system. These problems have, however, been overcome by a system in which the sensed, excessively low or high, pressures operate a timer. The timer produces a pulse, of predetermined, adjustable time duration, which is sent to all of the regulators controlling gas to the sensing low point. This is followed by an adjustable waiting period, sufficient to permit stabilization of the change. This "command" and "wait" cycle is repeated (a pulse of the same duration followed by a waiting period of the same duration), until the pressure is within limits, and is automatically discontinued when this point is reached. The pulses are either negative or positive depending upon whether the pressure is to be raised or lowered. The system also is provided with a manual (raise and lower) push buttom command for each regulator, in the event of failure of the automatic system.

As well as this system has served its purpose, it is not without problems. First of all, the manual override is designed to individually control each of a plurality of regulators separately, thus contributing to unbalance in a system which was originally balanced and requiring the same hectic dispatcher operation of the non-automated system. Secondly, no means is provided at the low point telemeter transmitter in the event of failure of the primary unit. Finally, the pressure range between the high and low points is still broader than desirable, thus making the high pressure higher than desirable and contributing to leakage losses between the regulator and the ultimate customer.

It is therefore, an object of the present invention to provide an improved gas distribution system which overcomes the above-mentioned disadvantages. Another object of the present invention is to provide an improved gas distribution system which can be manually operated to simultaneously adjust a plurality of regulators. A further object of the present invention is to provide am improved gas distribution system which automatically adjusts a plurality of regulators in the event of failure of the primary system. Yet another object of the present invention is to provide an improved gas distribution system which can maintain gas pressure within a small range of pressures despite large fluctuations in demand. These and other objects of the present invention will be apparent from the following description.

SUMMARY OF THE INVENTION

In a gas distribution system having a plurality of gas collection lines connected to a customer distribution network, a central control station remotely located with respect to said collection lines, control valve means mounted in each of said collection lines for adjusting the gas discharged from said collection lines, telemeter receiver means equal in number to the number of said control valve means and operatively connected to said control valve means for operating the same in response to signals received by said telemeter receiver means, telemeter transmitter means located in said control station and operatively connected to said telemeter receiver means, and control means operatively connected to said telemeter transmitter means for producing a plurality of individual signals, equal in number to the number of said control valve means, when the gas pressure at a predetermined point in said distribution network is above or below a predetermined range and impressing said signals on said telemeter transmission means, the improvement comprising a plurality of first switch means in said control means, equal in number to the number of said control valve means and coupled thereto through said telemeter transmitter means and said telemeter receiver means and having an automatic contact for automatic operation of each of said control valves individually and a manual contact operatively coupled to all of said control valve means; and second switch means operatively coupled to all of said manual contacts of said first switches, having a first contact for transmitting a first signal to all of said control valve means simultaneously when the gas flow from said collection lines is to be increased and a second contact for transmitting a second signal to all of said control valve means simultaneously when the gas flow from said collection lines is to be decreased. The system may also include a pressure sensitive device mounted at the predetermined point in the distribution network at a location remote from the control station, telemeter transmitter means operatively coupled to said pressure sensitive device for transmitting a signal, indicative of the sensed pressure, to said control station, a telemeter receiver in said control station for receiving said signal operatively connected to said telemeter transmitter means and signal means, including means for transmitting a signal to said control station independently of said telemeter transmitter means when said telemeter transmitter means fails and located at said predetermined point, and indicator means located at said control station for receiving said signal and indicating receipt of said signal and causal failure of said telemeter transmitter means. The control means may also include timer means operative upon receipt of a signal indicative of an abnormal pressure at the predetermined point and a plurality of multi-position switch means equal in number to the number of control valve means and operatively coupled thereto and having means for adjusting the on time of each of said positions of said switch means to preselected, different periods of time shorter than the time of operation of said timer.

DESCRIPTION OF THE PREFERRED EMBODIMENTS

Figure 1:
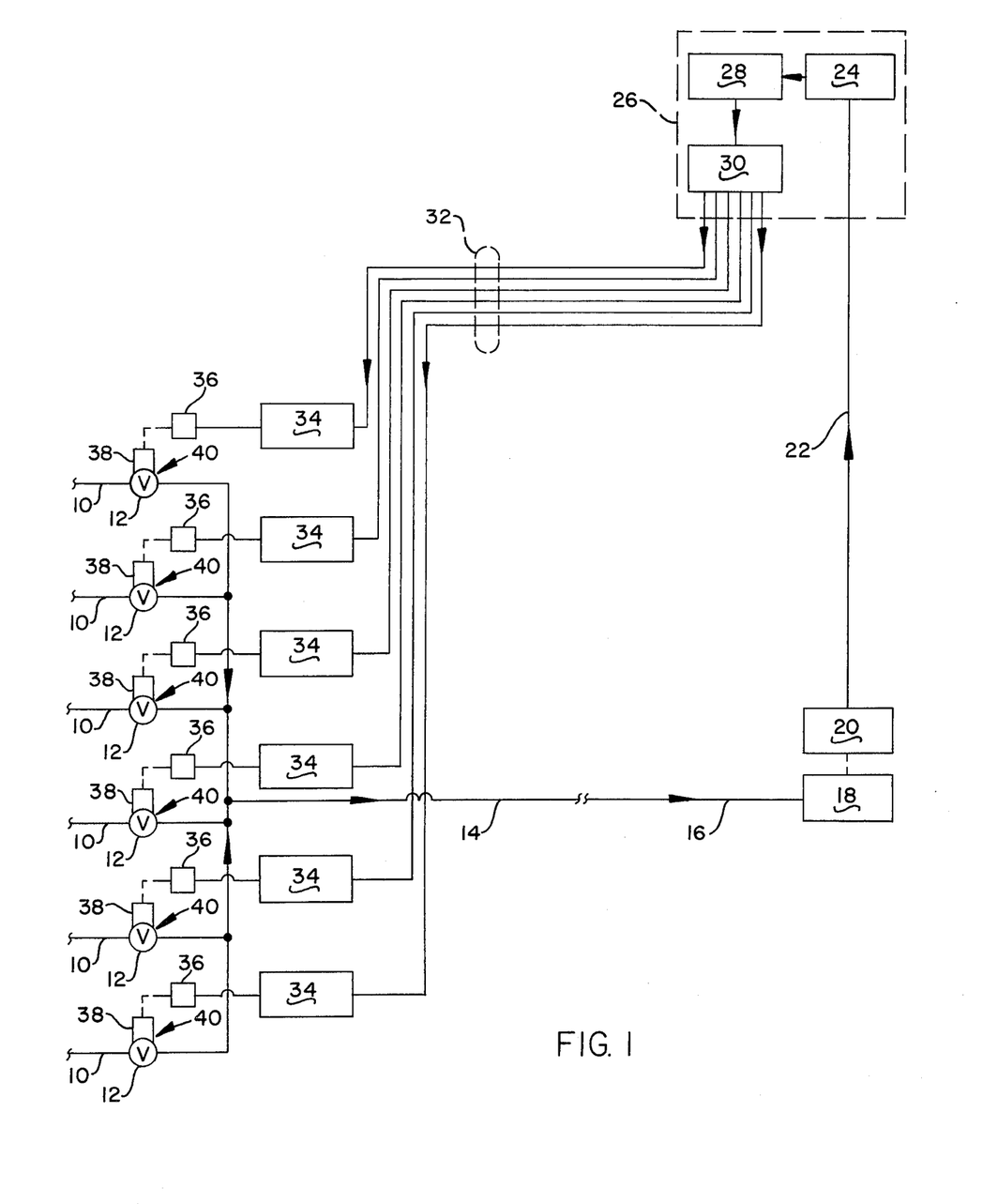
FIG. 1 is a block diagram of the overall gas distribution system of the present invention.

FIG. 1, illustrates the gas distribution of the present invention. In accordance with FIG. 1, a plurality of gas collection lines 10 are connected through control valves 12 to a single line 14 which, in turn, leads to a complex gas distribution network (shown only partially). The gas distribution network includes a line 16, in which experience or actual testing has demonstrated that the gas pressure will be the lowest for the distribution network or the low point of the distribution network. The pressure in line 16 is continuously monitored by a pressure responsive device 18, such as a manometer. Operatively connected to pressure responsive device 18 is a telemeter transmitter 20 adapted to transmit measured pressure data over a leased telephone line 22, or other like remote transmission means. Signals from line 22 are delivered to a telemeter receiver 24, located in a central control office of station 26. Signals received by receiver 24 are fed to control system 28, where they are automatically analyzed and operated on, as more fully described hereafter. As appropriate, control system 28 feeds appropriate signals to telemeter transmitter 30, which, in turn, transmits such signals over telephone line 32 to a plurality of telemeter receivers 34 located at each valve 12. Receivers 34 transmit signals to a plurality of remote set controllers 36. Remote set controllers 36 are operatively connected to valve positioners 38 which, in turn, are operatively connected to valves 12 and operate the same. Valve positioners 38 and valves 12 make-up regulators 40.

Figure 2:
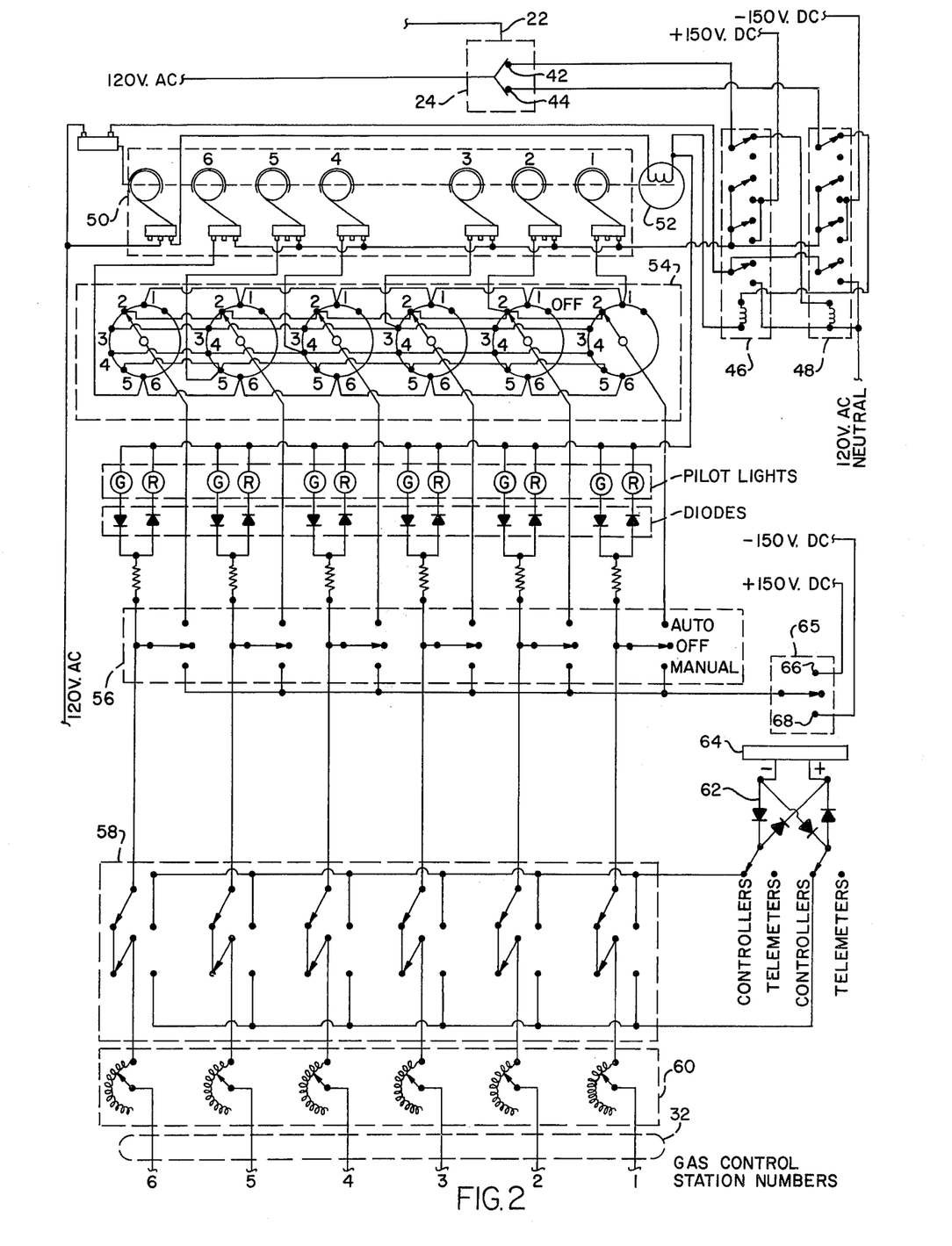
FIG. 2 is an electrical schematic of the control center portion of the system of FIG. 1.

FIG. 2 shows the actual control system of the present invention. In this Figure, signals from telephone line 22 are fed to telemeter receiver 24. Telemeter receiver 24 is provided with high and low alarm contacts 42 and 44, respectively. Contacts 42 and 44 should be adjustable to provide for actuation over a pressure scale range of 0 to 25, either in inches of water on an ounces system or psig. for an intermediate pressure system. This will permit adjustment of the pressure range between 5 and 20. In actual practice, utilizing the system of the present invention, it has been found that the low contact 44 can be set to operate at about 8 to 10 lbs. or inches pressure and the high contact 42 at about 1½ to 2 above the low pressure.

In the event that the pressure at the low point, as measured at the system low point by pressure sensitive device 18 (FIG. 1), is above or below the pressure set for operation of contacts 42 or 44, respectively, the appropriate contact closes. If contact 42 is closed, a −150 Volt DC signal is applied to lower relay 46 and, if contact 44 is closed, a +150 Volt DC signal is applied to raise relay 48. The relays, in turn, apply the specified signal to the common contacts of six cam-operated switches 50 of a timer 52, having a cycle of 4 minutes duration. Each cam is adjustable to a time span of 2 to 98% (approximately) of the 4 minute cycle. In practice, the cams are adjusted to 3 intervals with the number 1 cam set for 3 seconds, the number 2 cam for 6 seconds, etc., and the number 6 cam for 18 seconds.

The normally-closed contacts of cams 50 are connected to seven-position, multi-point, rotary wafer switches 54. The number 1 position of each cam represents an off function. In each circuit, a connection is made to the common terminal at the wafer switches 54 and one terminal of single-pole, double-pole, double-throw switches 56. Switches 56 have automatic, manual and center-off contacts, as shown. The common terminals of switches 56 are, in turn, connected to the common terminals of double-pole, double-throw, locking, push button switches 58. The normally-closed contacts of both poles of the switches 58 are bridged together. The common contacts of the remaining poles of switches 58 are connected to one of the outside terminals of 5000, ohm, 5 watt potentiometers 60. The remaining normally-open contacts of each pole of switches 58 are connected to a diode bridge 62 and then to a 0 to 50 ma DC meter 64. Bridge 62 and meter 64 permit one to adjust the potentiometers 60 to allow a current flow of about 30 milliamps DC. The center or wiper contacts of potentiometers 60 are connected to telephone line 32. The +150 or −150 Volt DC signals are fed over telephone line 32 to the telemeter receivers 34 at the gas control sites where they operate to incrementally raise or lower the gas pressure, dependent upon the duration of the time pulses selected by wafer switches 54.

The manual contacts of switches 56 are connected to the common pole of momentary-contact, single-pole, double-throw switch 65. The remaining contacts of switch 65 are raise contact 66 and lower contact 68. The raise contact 66 is connected to the +150 Volt DC line and the lower contact 68 is connected to the −150 Volt DC line. In the event of the failure of the automatic control system for any reason, switch 65 is operated in the raise or lower position for a suitable period of time and then released for a waiting period, sufficient to permit the pressure adjustment to stablilize at the low point. If the pressure is still out of the desired range, this procedure is repeated until the proper pressure is attained. This manual override accomplishes the important objectives of not only simplifying the time-consuming and complex task of manually adjusting the gas pressures at all of a plurality of regulator stations but also maintains the balance of a previously and delicately balanced collection system.

Figure 3:
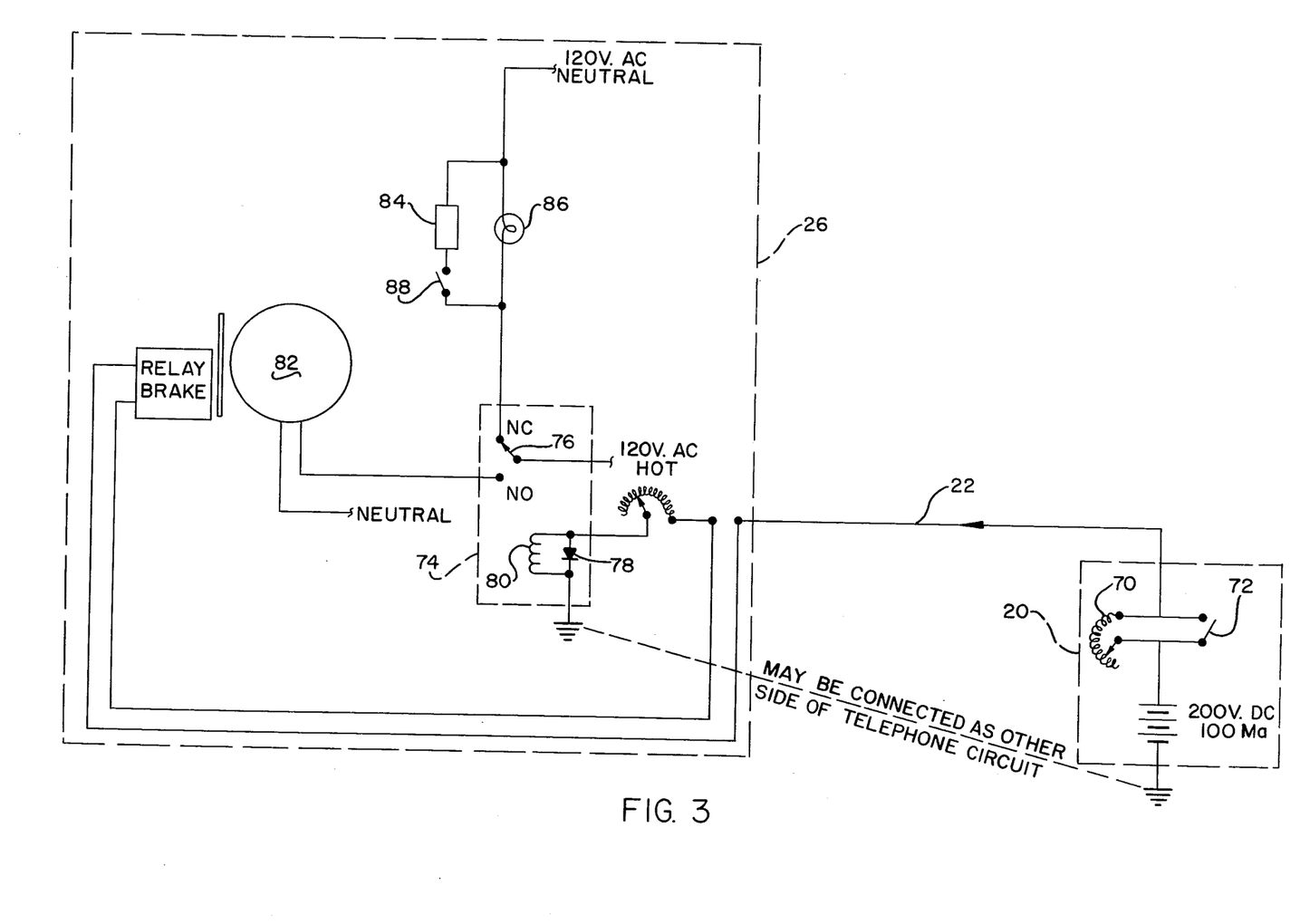
FIG. 3 is an electrical schematic of the automatic means for adjusting gas pressure in the system of FIG. 1 in the event of primary system failure.

FIG. 3 of the drawings shows a fail-safe circuit adapted to provide an appropriate signal in the event that the primary, low point telemeter circuits fails for any reason. In FIG. 3, a primary 200 Volt DC, 100 ma power supply, and a like standby unit, is connected to a 10,000 ohm, 5 watt potentiometer 70. Potentiometer 70 is installed across the terminals of a mercury switch 72 in the telemeter transmitter 20 (FIG. 1) at the low point telemeter site. Potentiometer 70 controls the open circuit current at 15 ma to hold in a 15 ma relay 74, having a single-pole, double-throw switch 76 mounted in the controller 26 (FIG. 1). The zener diode 78, across the coil 80 of relay 74 is used to maintain the 15 ma across the coil 80 when the full 40 to 45 ma of the telemeter current is flowing during the closed cycle of the mercury switch 72. The normally-open contact of relay 74 is connected to the motor lead of a drive motor 82 of a differential positioning unit in telemeter receiver 24 (FIG. 1). The normally-closed contact of switch 76 to a 2900 cycle Sonalert or similar howler 84. A pilot light 86 is mounted across a single-pole, single-throw switch 88 and howler 84 to give a visual indication that the low point telemeter circuit has failed after the howler is turned off by switch 88. A source of 125 Volt AC power is attached to the common terminal of relay 74. In the event of a failure of the low point telemeter circuit, differential positioning motor 82 drops out the raise and lower relay (46 and 48, FIG. 2) and sound an audible alarm as well as turning on a visual alarm. In this case, the system may be manually operated by switch 65 (FIG. 2) as previously described.

The operation of the system will now be summarized.

First of all, the gas distribution system is balanced so that a substantially constant pressure can be maintained for the controlled low point pressure. This is greatly facilitated by utilizing adjustable width or duration pulses for the operation of each control valve. Also, a time duration is selected for each control valve by a time-select knob on a control panel. As previously stated, the time durations are, for example, 3 seconds for position 1 of the rotary switches, 6 seconds for position 2, 9 seconds for 3, 12 seconds for 4, 15 seconds for 5 and 18 secondsfor 6, within a 4 minute time cycle. By way of example, if position 2 or 6 seconds is selected for a particular control valve and the timer is actuated, pulses of 6 seconds duration, with the remaining time of the 4 minute cycle divided equally as waiting time between pulses, the 6 second pulses to control valve will be repeated until the desired low point pressure has been attained. The pulses will then be stopped but the timer will continue to operate until the 4 minute cycle is completed. The alarm, actuation or high and low set points of the controller are also set to the desired high and low values. In the system of the present invention, typical settings are, for example, 8 to 10 lbs., 10 to 11.5 lbs., etc. Accordingly, it has been found that a range as small as 1.5 lbs. is possible and the low point pressure can be effectively maintained. This compares with a setting of about 20 lbs. with a range of 5 to 6 lbs., which is typical of prior art systems.

If the telemetered pressure from the low point is below the minimum setting of the telemeter receiver contacts, a mercury switch closes and a red light comes on on the receiver control panel. The raise relay of the controller is also actuated. This relay operation, in turn, starts the timer motor and applies a +150 Volt DC signal to the selected multi-point switch contacts. The switches then operate to send pulses to the control valves, are previously described. Likewise, if the pressure at the low point exceeds the maximum set for the high pressure contact of the receiver, the lower relay is energized and the system operates as just described except that a −150 Volt DC signal is applied to the circuit to the control valves.

In the operation of the present system, in addition to maintaining a substantially constant pressure, it has been found possible to reduce gas losses substantially below previous values, due to the low pressure which can be maintained in the distribution network while still maintaining a safe minimum pressure at the low point.

The telemeter transmission from the low point to the control station and from the control station to the collection lines is preferably by telephone line but may be by radio or other appropriate means.

The equipment at the low point may be any of the commercially available systems.

The value control systems may also be commercially available equipment, such as Bristol or American controllers of the proportional/reset type, or valve positioners actuating pilot regulators.

The telemeter receiver at the control station may be a Bristol 1M1M670-E63C telemeter receiver including a strip chart recorder.

While specific equipment and specific examples have been set forth herein as an aid to description of the system, it is to be recognized that variations, modifications and equivalents will be apparent to one skilled in the art and the invention is to be limited only in accordance with the appended claims.

What is claimed is:

1. In a gas distribution system having a plurality of gas collection lines connected to a customer distribution network; control valve means, mounted in each of said collection lines, for adjusting the gas discharge from said collection lines to said distribution network; pressure-sensing means, mounted at a predetermined point in said distribution network, for sensing the pressure at said predetermined point; a central control station located at a point remote from said collection lines; control means, located in said control station, for simultaneously producing a plurality of individual, first signals, equal in number to the number of said control valves, when the gas pressure sensed at said predetermined point is below a predetermined value or alternately producing a plurality of simultaneous individual, second signals, equal in number to the number of said control valves and differing from said first signals, when the gas pressure sensed at said predetermined point exceeds a predetermined value; telemeter transmitter means, located in said control station and operatively connected to said control means, for transmitting said first and second signals from said control station to the location of said collection lines; and telemeter receiver means, located at said location of said collection lines and operatively connected to said control valves, or simultaneously applying each of said first signals to one of said control valves in a manner to increase the gas discharged from the one of said collection lines in which said one valve is located in response to the individual signal for it or simultaneously applying each of said second signals to one of said control valves in a manner to decrease the gas discharged from the one of said collection lines in which said one valve is located in response to the individual signal for it; the improvement comprising, a plurality of time-adjusting means, operatively connected between said control means and said telemeter transmitter means and equal in number to the number of said control valves, for individually adjusting the time duration of each of said first and second signals applied to said control valves.

2. A system in accordance with claim 1 wherein a switch means having two modes of operation is located in the control station and is operatively connected to the telemeter transmitter in a manner to by-pass the control means and the time-adjusting means, for producing a third signal, when the gas pressure at the predetermined point is below a predetermined value and said switch is in a first mode of said two modes of operation, and simultaneously applying said third signal to all of said control valves for a period of time during which said switch is held in said first mode of operation and producing a fourth signal differing from said third signal, when the gas pressure at said predetermined point exceeds a predetermined value and said switch is in a second mode of said two modes of operation, and simultaneously applying said fourth signal to all of said control valves for a period of time during which said switch is held in said second mode of operation.

3. A system in accordance with claim 2 wherein the switch is operable to produce a plurality of the third signals and a plurality of the fourth signals in time-spaced sequences.

4. A system in accordance with claim 1 wherein the predetermined point is remotely located with respect to the control station and the collection lines; a second telemeter transmitter is located at said predetermined point and operatively coupled to the pressure-sensing means, for transmitting a signal indicative of the sensed pressure to said control station; a second telemeter receiver is located in said control station and operatively connected to the control means for receiving said signal from said second telemeter transmitter; a failure-detecting means is operatively connected to said second telemeter transmitter for sensing a failure of said second telemeter transmitter and transmitting a signal indicative of said failure to said second telemeter receiver; and a signalling means is located in said control station and operatively connected to said second telemeter receiver for producing an observable signal when said signal indicative of said failure is received.

5. A system in accordance with claim 4 wherein cut-out means is operatively connected to the first telemeter transmitter to deactivate said control means and said time-adjusting means when the signal indicative of the failure is received.

6. A system in accordance with claim 1 wherein a timer means is operatively connected between the control means and the time-adjusting means for producing a plurality of the first signals and a plurality of the second signals in timespaced sequences.

7. In a gas distribution system having a plurality of gas collection lines connected to a customer distribution network; control valve means, mounted in each of said collection lines, for adjusting the gas discharge from said collection lines to said distribution network; pressure-sensing means, mounted at a predetermined point in said distribution network, for sensing the pressure at said predetermined point; a central control station located at a point remote from said collection lines; control means, located in said control station, for simultaneously producing a plurality of individual, first signals, equal in number to the number of said control valves, when the gas pressure sensed at said predetermined point is below a predetermined value or alternately producing a plurality of simultaneous individual, second signals, equal in number to the number of said control valves and differing from said first signals, when the gas pressure sensed at said predetermined point exceeds a predetermined value; telemeter transmitter means, located in said control station and operatively connected to said control means, for transmitting said first and second signals from said control station to the location of said collection lines; and telemeter receiver means, located at said location of said collection lines and operatively connected to said control valves, for simultaneously applying each of said first signals to one of said control valves in a manner to increase the gas discharged from the one of said collection lines in which said one valve is located in response to the individual signal for it or simultaneously applying each of said second signals to one of said control valves in a manner to decrease the gas discharge from the one of said collection lines in which said one valve is located in response to the individual signal for it; the improvement comprising, switch means having two modes of operation, located in said control station and operatively connected to said telemeter transmitter in a manner to by-pass said control means, for producing a third signal, when the gas pressure at said predetermined point is below a predetermined value and said switch is in a first mode of said two modes of operation, and simultaneously applying said third signal to all of said control valves for a period of time during which said switch is held in said first mode of operation and producing a fourth signal differing from said third signal, when the gas pressure at said predetermined point exceeds a predetermined value and said switch is in a second mode of said two modes of operation, and simultaneously applying said fourth signal to all of said control valves for a period of time during which said switch is held in said second mode of operation.

8. A system in accordance with claim 7 wherein the switch is operable to produce a plurality of the third signals and a plurality of the fourth signals in time-spaced sequences.

9. In a gas distribution system having a plurality of gas collection lines connected to a customer distribution network; control valve means, mounted in each of said collection lines, or adjusting the gas discharge from said collection lines to said distribution network; pressure-sensing means, mounted at a predetermined point in said distribution network for sensing the pressure at said predetermined point; first telemeter transmitter means, located at said predetermined point and operatively connected to said pressure-sensing means, for transmitting a first signal indicative of the sensed pressure, a central control station remotely located with respect to said predetermined point and the location of said collection lines; a first telemeter receiver means, located in said control station and operatively coupled to said first telemeter transmitter, for receiving said first signal control means located in said control station and operatively connected to said first telemeter receiver, for producing a second signal, when the gas pressure sensed at said predetermined point is below a predetermined value, or alternately producing a third signal, when the gas pressure sensed at said predetermined point is above a predetermined value; second telemeter transmitter means, located in said control station and operatively coupled to said control means, for transmitting said second and third signals; and a second telemeter receiver located at said location of said collection lines and operatively connected to said control valves, for simultaneously applying said second signal to all of said control valves in a manner to increase the gas discharged from said collection lines in response to said second signals or simultaneously applying said third signal to all of said control valves in a manner to decrease the gas discharged for said collection lines in response to said third signal; the inprovement comprising, a failure-detecting means, operatively connected to said first telemeter transmitter, for sensing a failure of said first telemeter transmitter and transmitting a signal indicative of said failure to said first telemeter receiver; and signalling means, located in said control station and operatively connected to said first telemeter receiver, for producing an observable signal when said signal indicative of said failure is received.

10. A system in accordance with claim 9 wherein cut-out means is operatively connected to the second telemeter transmitter to deactivate the control means when the signal indicative of the failure is received.

11. A system in accordance with claim 9 wherein a switch means having two modes of operation is located in the control station and is operatively connected to the second telemeter transmitter in a manner to by-pass the control means, for producing a fourth signal, when the gas pressure at the predetermined point is below a predetermined value and said switch is in a first mode of said two modes of operation, and simultaneously applying said fourth signal to all of the control valves for a period of time during which said switch is held in said first mode of operation and producing a fifth signal differing from said fourth signal, when the gas pressure at said predetermined point exceeds a predetermined value and said switch is held in a second mode of said two modes of operation, and simultaneously applying said fifth signal to all of said control valves for a period of time during which said switch is held in said second mode of operation.

12. A system in accordance with claim 11 wherein the switch is operable to produce a plurality of fourth signals and a plurality of fifth signals in time-spaced sequences.

13. In a gas distribution system having a plurality of gas collection lines connected to a customer distribution network; control valve means, mounted in each of said collection lines, for adjusting the gas discharge from said collection lines to said distribution system; pressure sensing means mounted at a predetermined point in said distribution system for sensing the pressure at said predetermined point; control means for simultaneously producing a plurality of individual, first signals, equal in number to the number of said control valves, when the gas pressure sensed by said pressure sensing means is below a predetermined value or alternately producing a plurality of simultaneous individal, second signals, equal in number to the number of said control valves and differing from said first signals, when the gas pressure sensed by the pressure sensing means exceeds a predetermined value; means to transmit said first and second signals from said control means to said control valves such that the first signal increases the gas discharge from the collection lines and the second signal decreases the gas discharge from said collection lines; the improvement comprising, a plurality of time-adjusting means, operably connected between said control means and said control valves, for individually adjusting the time duration of each of the first and second signals applied to each of said control valves.

14. The combination called for in claim 13 wherein the plurality of time adjusting means comprises a timer; means connection the timer to the control means to receive a signal from said control means to energize said timer; a plurality of normally open cam operated switches connected in series with the means to transmit a signal from the control means to the control valve means; means connecting the timer to the cam operated switches such that as the timer is energized the cam operated switches are closed by the timer for a sufficient length of time to transmit the first or second signals to the control valve means.

* * * * *

UNITED STATES PATENT AND TRADEMARK OFFICE
CERTIFICATE OF CORRECTION

PATENT NO. : 4,034,774
DATED : July 12, 1977
INVENTOR(S) : Henry F. Clymer; John J. Kaltenbaugh It is certified that error appears in the above-identified patent and that said Letters Patent are hereby corrected as shown below:

In Column 7, line 68, change "or" to -- for --.

Signed and Sealed this

Eighteenth Day of April 1978

[SEAL]

Attest:

RUTH C. MASON
Attesting Officer

LUTRELLE F. PARKER
Acting Commissioner of Patents and Trademarks